(12) United States Patent
Koyama et al.

(10) Patent No.: US 8,480,165 B2
(45) Date of Patent: Jul. 9, 2013

(54) VEHICLE BODY REAR STRUCTURE

(75) Inventors: Hiroyuki Koyama, Shizuoka-ken (JP);
Koji Uchida, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 40 days.

(21) Appl. No.: 12/586,384

(22) Filed: Sep. 21, 2009

(65) Prior Publication Data
US 2010/0072786 A1 Mar. 25, 2010

(30) Foreign Application Priority Data
Sep. 24, 2008 (JP) ................................ 2008-243714

(51) Int. Cl.
*B62D 21/00* (2006.01)

(52) U.S. Cl.
USPC .................................................. 296/203.04

(58) Field of Classification Search
USPC .............. 296/203.4, 193.07, 193.08, 193.04, 296/193.02, 187.08, 187.11, 184.1, 24.3
See application file for complete search history.

(56) References Cited

U.S. PATENT DOCUMENTS

| | | | | |
|---|---|---|---|---|
| 2,136,122 | A | * | 11/1938 | Almdale ........................ 280/797 |
| 2,954,998 | A | | 10/1960 | Kushler et al. |
| 5,110,177 | A | * | 5/1992 | Akio ........................ 296/187.11 |
| 5,472,259 | A | | 12/1995 | Akiyama et al. |
| 5,549,350 | A | | 8/1996 | Akiyama et al. |
| 5,567,005 | A | | 10/1996 | Kosuge et al. |
| 5,714,628 | A | * | 2/1998 | Challenger .................... 560/122 |
| 5,829,824 | A | | 11/1998 | Yamamuro et al. |
| 6,568,747 | B2 | * | 5/2003 | Kobayashi .................... 296/204 |
| 6,932,405 | B2 | * | 8/2005 | Nakagawa et al. ............. 296/29 |
| 2006/0121795 | A1 | * | 6/2006 | Hashimura et al. ........... 439/681 |
| 2006/0197300 | A1 | * | 9/2006 | Nakashima et al. ... 280/124.109 |
| 2006/0202519 | A1 | * | 9/2006 | Latimer et al. ........... 296/203.04 |
| 2007/0029841 | A1 | * | 2/2007 | Asahi et al. .............. 296/203.04 |
| 2007/0158977 | A1 | * | 7/2007 | Yasukouchi et al. ...... 296/203.04 |

FOREIGN PATENT DOCUMENTS

| | | |
|---|---|---|
| DE | 4335586 A1 | 4/1994 |
| JP | H04-075782 U | 4/1992 |
| JP | 2005-112269 A | 4/2005 |
| JP | 2006-035934 A | 2/2006 |

OTHER PUBLICATIONS

Japanese Office Action for Application No. 2008-243714 dated Oct. 16, 2012.
German Office Action for Application No. 102009042950.6 dated Nov. 8, 2012.

* cited by examiner

*Primary Examiner* — Glenn Dayoan
*Assistant Examiner* — Sunsurraye Westbrook
(74) *Attorney, Agent, or Firm* — Lerner, David, Littenberg, Krumholz & Mentlik, LLP

(57) ABSTRACT

A vehicle (1) includes first and second rear-floor cross members (4, 5) provided between right and left rear-floor side members (2, 2) in a vehicle body rear part and a pair of right and left rear-floor cross member braces (6, 6) provided therebetween. The second rear-floor cross member is formed by a three-member connected body consisting of right and left extension parts (52, 52) connected to the right and left rear-floor side members and a body part (51) arranged therebetween. The rear-floor cross member braces are connected to the body part (51) of the second rear-floor cross member. Shock energy of a shock load applied to the vehicle body rear part from the rear can be absorbed efficiently while the deformation of a rectangular region surrounded by the first and second rear-floor cross members and the right and left rear-floor cross member braces is restrained.

4 Claims, 3 Drawing Sheets

VEHICLE BODY REAR STRUCTURE

CROSS-REFERENCE TO RELATED APPLICATIONS

The present application claims priority from Japanese Patent Application No. JP 2008-243714, filed in the Japanese Patent Office on Sep. 24, 2008, the entire content of which is incorporated herein by reference.

BACKGROUND OF THE INVENTION

The present invention relates to a vehicle body rear structure of an automobile.

For a passenger car having a monocoque body structure, in comparison with a front floor that is made low to secure an interior space, in a vehicle body rear part on the rear of a rear seat, a rear-floor is provided at a position higher than the front floor to utilize a space under the rear seat as an installation space for a fuel tank and the like. For the rear-floor, rear-floor side members are provided along both side parts thereof, and rear-floor cross members are provided between the right and left rear-floor side members.

In such a vehicle body rear structure, to improve the rigidity of the rear-floor, in some cases, two rear-floor cross members are provided so as to provide a spacing in the longitudinal direction, and a pair of right and left rear-floor cross member braces are provided therebetween (refer to JP2005-112269 and JP4-75782U). The rectangular region surrounded by these four members is suitable for disposing a part that is desired to avoid damage as much as possible, such as a base part of a fuel pipe or a brake pipe, because of its high rigidity.

However, if the rigidity of the entirety of the rear-floor is too high, the amount of deformation produced when a shock load is applied from the rear is small, so that there is a possibility that the shock energy will not be absorbed sufficiently. In the case in which the absorption of energy in this region is insufficient, the rear-floor cross members are moved frontward by the remaining shock load and come into contact with a fuel tank, and this may deform or damage the fuel tank.

BRIEF SUMMARY OF THE INVENTION

The present invention has been made in view of the above circumstances, and accordingly, an object thereof is to provide a vehicle body rear structure that can restrain deformation of a rectangular region, which is surrounded by front and rear rear-floor cross members and right and left rear-floor cross member braces, caused a shock load applied to a vehicle body rear part from the rear, can prevent parts disposed in this region from being damaged, and can absorb shock energy efficiently.

To achieve the above object, the present invention provides a vehicle body rear structure including right and left rear-floor side members extending substantially in the vehicle longitudinal direction on both sides of a vehicle body rear part; a first rear-floor cross member provided between the right and left rear-floor side members; a second rear-floor cross member provided between the right and left rear-floor side members on the rear of the first rear-floor cross member; and a pair of right and left rear-floor cross member braces provided between the first and second rear-floor cross members, wherein the second rear-floor cross member is formed by a three-member connected body consisting of right and left extension parts connected to the right and left rear-floor side members and a body part arranged therebetween; and the paired right and left rear-floor cross member braces are connected to the body part of the second rear-floor cross member.

As described above, the vehicle body rear structure in accordance with the present invention is configured so that the second rear-floor cross member positioned on the rear of the first rear-floor cross member is formed by the three-member connected body consisting of the right and left extension parts and the body part arranged therebetween, and the paired right and left rear-floor cross member braces are connected to the body part of the second rear-floor cross member. Therefore, deformation caused by a shock load applied to the vehicle body rear part from the rear is guided to the right and left extension parts that are liable to be deformed as compared with a rectangular region (rectangular frame part) surrounded by the first and second rear-floor cross members and the right and left rear-floor cross member braces, and shock energy can be absorbed efficiently while the floor rigidity of the vehicle body rear part contributing to the running stability is maintained. Also, deformation of the rectangular region is restrained, and the parts disposed in this region can be prevented from being damaged.

In the present invention, it is preferable that a second reinforcement extending at least throughout a connecting region with the right and left rear-floor cross member braces be joined to the body part of the second rear-floor cross member.

In this aspect, the deformation of the right and left extension parts is guided by the improved rigidity of the second rear-floor cross member body part, and the deformation of the rectangular region is further restrained. Therefore, the parts disposed in this region can be prevented from being damaged more surely, and the load from a spare tire housing to the second rear-floor cross member can surely be transmitted to the first rear-floor cross member. Also, the width in the vehicle longitudinal direction of the body part can be decreased, the installation space of the spare tire housing can be secured easily, and the degree of freedom for vehicle body design of this part can be increased while rigidity necessary for the body part is maintained by the second reinforcement.

In a preferred aspect of the present invention, the first rear-floor cross member is formed by a three-member connected body consisting of right and left extension parts connected to the right and left rear-floor side members and a body part arranged therebetween, and the paired right and left rear-floor cross member braces are connected to the body part of the first rear-floor cross member.

In this aspect, by the deformation, which is caused by the shock load applied to the vehicle body rear part from the rear, of the right and left extension parts of the first rear-floor cross member in addition to the right and left extension parts of the second rear-floor cross member, shock energy can be absorbed efficiently. Also, by the deformation of these four extension parts, the deformation of the rectangular region itself surrounded by the first and second rear-floor cross member body parts and the right and left rear-floor cross member braces is restrained, and the parts disposed in this region can be prevented from being damaged. Also, since the rectangular region (rectangular frame part) is deformed forward while its shape is maintained, even if the rectangular region comes into contact with a fuel tank or other parts arranged in the front, the whole of the first rear-floor cross member body part extending in the vehicle width direction comes into contact with the rear surface of the fuel tank, so that local contact with the fuel tank and deformation caused by this contact can be prevented.

In a further preferable aspect of the present invention, the first rear-floor cross member is configured so that first reinforcements are joined to the right and left side portions of the body part of the first rear-floor cross member including a connecting region with the right and left rear-floor cross member braces and the right and left extension parts of the first rear-floor cross member.

In this aspect, if a shock load is applied to the vehicle body rear part from the rear, the load applied to the rectangular region from the rear is transmitted to the rear-floor side members on both sides in the vehicle width direction via the right and left first reinforcements. Since the load is distributed to the whole of a monocoque body structure, the deformation of a cabin can be kept at a minimum. Also, main deformation is guided to portions around the parts in which the extension part of the second rear-floor cross member and the extension part of the first rear-floor cross member are attached to the rear-floor side member. Therefore, even if the shock energy is excessive, the deformation of the rectangular region is restrained, and the load applied to the parts disposed in this region and the fuel tank or the like provided in front of this region can be reduced more surely.

In a still further preferred aspect of the present invention, the connection between the body part and the extension part of the first and second rear-floor cross members and the connection between the body part of the first rear-floor cross member and the first reinforcement are made by the fastening of a screwing member penetrating the overlapping part.

In this aspect, the rectangular frame part formed by the body parts of the first and second rear-floor cross members and the right and left rear-floor cross member braces is detachable, so that the assembly and maintenance of the parts disposed in the frame part can be accomplished easily.

DETAILED DESCRIPTION

Figure 1:
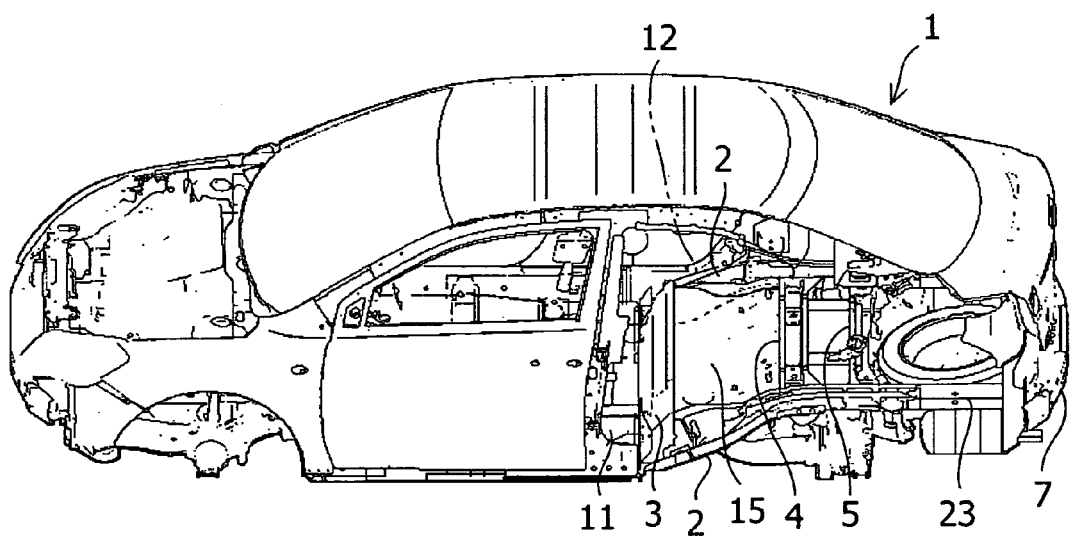
FIG. 1 is a perspective view of a vehicle having a vehicle body rear structure in accordance with the present invention, being viewed from the upper side in a state in which a rear door, a quarter panel, and a rear-floor panel are removed.

An embodiment of the present invention will now be described in detail with reference to the accompanying drawings. In FIG. 1, a rear-floor 12 on the rear of a rear seat position of the vehicle 1 is provided at a position higher than a front floor 11, and rear-floor side members 2, 2 are disposed along both side portions of the rear-floor 12.

Figure 5:
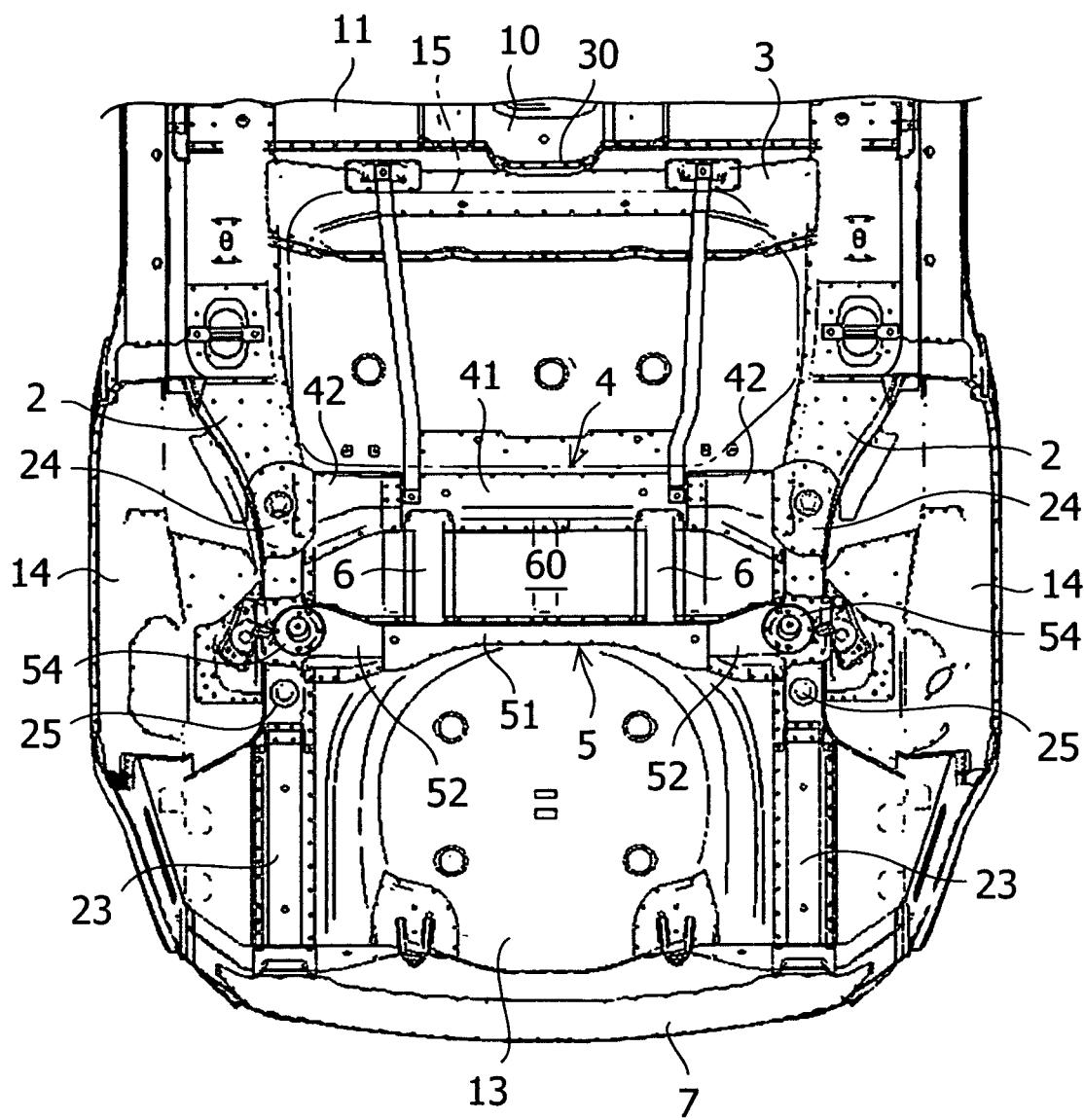
FIG. 5 is a bottom plan view of a vehicle body rear structure in accordance with an embodiment of the present invention.

Each of the rear-floor side members 2, 2 rises slantwise toward the rear from the front floor 11, reaching the height of the rear-floor 12 in a cabin rear part while curving toward the center in the vehicle width direction to avoid a wheel house 14, 14 for a rear wheel as shown in FIG. 5, and extending linearly toward the vehicle rear end. Between the right and left rear-floor side members 2, 2, three rear-floor cross members 3, 4 and 5 are provided so as to be separated in the vehicle longitudinal direction.

Figure 2:
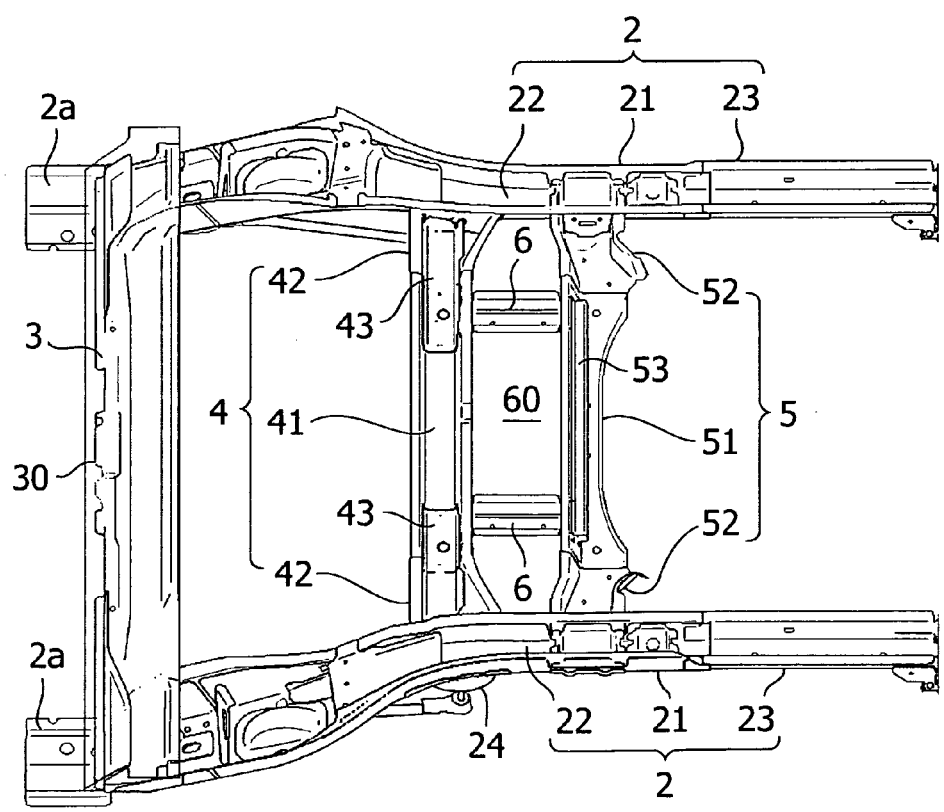
FIG. 2 is a perspective view of an essential portion of a vehicle body rear structure in accordance with an embodiment of the present invention, showing a frame structure of a vehicle body rear part.
Figure 3:
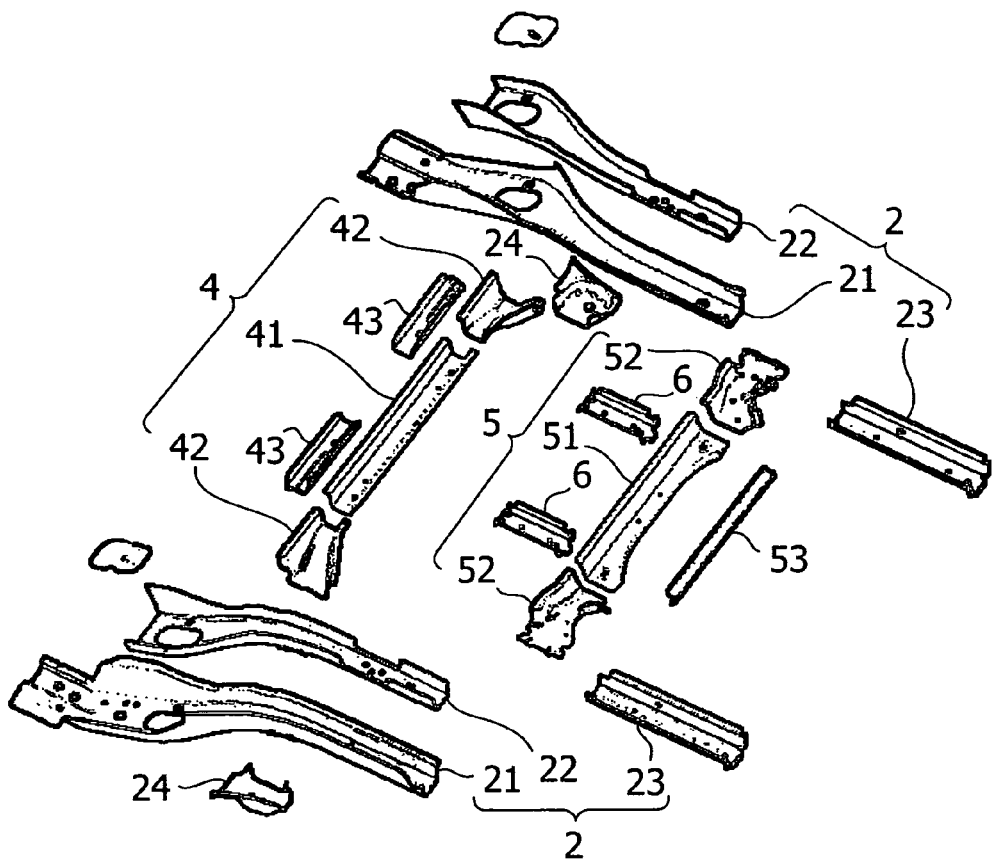
FIG. 3 is an exploded perspective view showing a disassembled state of the essential portion shown in FIG. 2.
Figure 4:
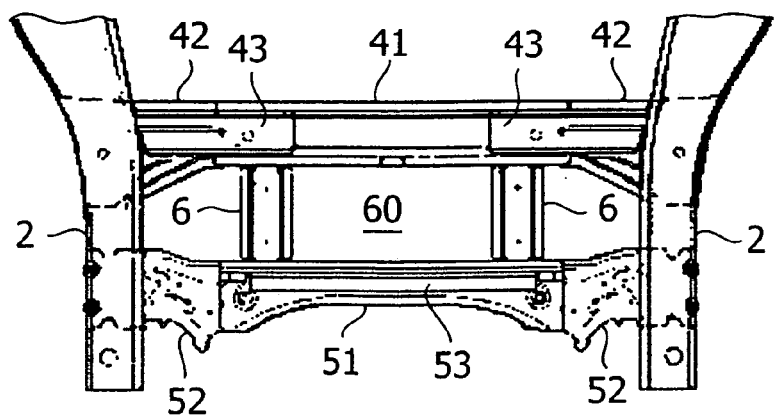
FIG. 4 is a plan view of the essential portion shown in FIG. 2.

FIG. 2 is a perspective view of an essential portion of the vehicle body rear structure, showing a frame structure of a vehicle body rear part, and FIG. 3 is an exploded perspective view showing a disassembled state of the essential portion shown in FIG. 2. In FIGS. 2 and 3, each of the rear-floor side members 2, 2 is formed into a closed section structure by joining an inner frame 22 to the inside of a U-shaped channel outer frame 21. At the rear end of the rear-floor side members 2, 2, a rear frame 23, 23 is extendingly provided, and to the rear end of the rear frame 23, 23, a rear bumper member 7 (rear bumper) is joined. A front end part 2a, 2a of the rear-floor side member 2, 2 is connected to a front floor side member, not shown.

Of the three rear-floor cross members 3, 4 and 5, the rear-floor front cross member 3 positioned at the forefront extends in the vehicle width direction in a level difference part between the front floor 11 and the rear-floor 12, rising slantwise from the rear end of the front floor 11, and is connected to a front end part of the rear-floor 12 in the upper rear end part thereof. In a central lower part of the rear-floor front cross member 3, an arch-shaped notch 30 (FIG. 5) corresponding to a floor tunnel for accommodating an exhaust pipe is provided.

The rear-floor center cross member 4 (first rear-floor cross member) extends in the vehicle width direction on the high surface of the rear-floor 12 on the rear of the rear-floor front cross member 3, and is disposed so as to connect the right and left rear-floor side members 2, 2 to each other. The rear-floor center cross member 4 is formed by a three-member connected body consisting of a body part 41 arranged in the center in the vehicle width direction and right and left extension parts 42, 42 connected to both sides of the body part 41, and is rigidly joined to the right and left rear-floor side members 2, 2 by spot welding in the end portions of the extension parts 42, 42.

To the connecting parts between the body part 41 and the extension parts 42, 42 of the rear-floor center cross member 4, reinforcements 43, 43 (first reinforcements) are connected as reinforcing members. Each of the reinforcements 43, 43 is joined in a state of being fitted to the inside of the U-shaped channel body part 41 and extension part 42, 42.

To the lower surface of a connecting part between the extension part 42, 42 of the rear-floor center cross member 4 and the rear-floor side member 2, 2, a mount 24, 24 (reinforcement) for a sub-frame (not shown) pivotally supporting a suspension arm for a rear wheel is joined. This sub-frame is formed into a diamond shape by channel materials or tube materials, and is installed, via a rubber bush, at four places of the mounts 24, 24 and mounts 25, 25 each provided on the lower surface of a portion close to the rear end of the rear-floor side member 2, 2 as shown in FIG. 5.

The rear-floor rear cross member 5 (second rear-floor cross member) extends in the vehicle width direction on the high surface of the rear-floor 12 on the rear of the rear-floor center cross member 4, and is disposed so as to connect the right and left rear-floor side members 2, 2 to each other. Like the rear-floor center cross member 4, the rear-floor rear cross member 5 is also formed by a three-member connected body consisting of a body part 51 arranged in the center in the vehicle width direction and right and left extension parts 52, 52 connected to both sides of the body part 51, and is rigidly joined to the right and left rear-floor side members 2, 2 by spot welding in the end portions of the extension parts 52, 52.

To the body part 51 of the rear-floor rear cross member 5, a reinforcement 53 (second reinforcement) extending along the approximately overall length in the lengthwise direction thereof is joined. The reinforcement 53 has a U-shaped channel accommodated in the cross section of the body part 51, and both the flange portions thereof are welded to the longitudinal wall surface on the front side of the body part 51 to form a reinforcing structure having a closed cross section in the body part 51. With respect to the body part 51 and the reinforcement 53 extending linearly in the vehicle width direction, the extension parts 52, 52 of the rear-floor rear cross member 5 are arranged so as to tilt to the vehicle front side toward the right and left rear-floor side members 2, 2.

The edge portion on the vehicle rear side of the body part 51 of the rear-floor rear cross member 5 is joined to a floor panel defining a spare tire housing 13 under a cargo compartment floor, and is curved into an arch shape so as to conform to the front end shape of the spare tire housing 13. On the lower surfaces of the right and left extension parts 52, 52, mounts 54, 54 for suspension springs (not shown) are arranged.

The rear-floor center cross member 4 and the rear-floor rear cross member 5 are connected to each other by a pair of right and left rear-floor cross member braces 6, 6 provided at two locations at the right and left between the body parts 41 and 51 thereof. The front and rear body parts and 51 and the right and left rear-floor cross member braces 6, 6 form a rectangular frame part (41, 51, 6, 6).

As described before, by joining the reinforcement 53, the rigidity of the body part 51 of the rear-floor rear cross member 5 is enhanced, and by forming the rectangular frame part (41, 51, 6, 6) by means of the rigid joining to the body part 41 of the rear-floor center cross member 4 via the right and left rear-floor cross member braces 6, 6 in this high-rigidity region, the rigidity of the frame part (41, 51, 6, 6) itself is made very high. Since the rigidity of the frame part (41, 51, 6, 6) is enhanced as described above, the rigidities of the four extension parts 42, 42, 52, 52 interposed between the body parts 41 and 51 and the right and left rear-floor side members 2, 2 are relatively low.

Since the rear-floor center cross member 4 and the rear-floor rear cross member 5 provided so as to provide a spacing in the longitudinal direction and the paired right and left rear-floor cross member braces 6, 6 provided between the body parts 41 and 51 thereof are rigidly joined to each other in between the right and left rear-floor side members 2, 2 extending in the vehicle longitudinal direction along both sides of the rear-floor 12, and are incorporated in a monocoque body structure, the vehicle 1 configured as described above has floor rigidity of the vehicle body rear part having high running stability, and at the same time, has high shock absorbing properties against a shock load applied from the rear by a collision or the like.

The shock load applied to the vehicle 1 from the rear is transmitted to the rear-floor side member 2 through the rear bumper member 7 (rear bumper) and is also transmitted to the rear-floor panel 13. Therefore, the shock energy is basically absorbed by the deformation of the rear-floor side members 2, 2 and the rear-floor panel 13.

At this time, the body part 51 of the rear-floor rear cross member 5 is pushed forward by the rear-floor panel 13 including a spare tire, and thereby the rectangular frame part (41, 51, 6, 6) formed by the front and rear rear-floor cross member body parts 41 and 51 and the right and left rear-floor cross member braces 6, 6 is pushed forward. Thereby, deformation is guided to the extension parts 42 and having a relatively low rigidity, which are interposed between the right and left rear-floor side members 2, 2 and the rectangular frame part (41, 51, 6, 6). In a process in which the highly rigid rectangular frame part (41, 51, 6, 6) is displaced forward as a whole in the state in which the shape thereof is substantially maintained, shock absorption is further accomplished by the deformation of the four extension parts 42 and 52.

In particular, if either one of the right and left rear-floor side members 2, 2 is deformed more greatly by a rear end offset collision or the like from the vehicle rear, the above-described shock absorbing operation is useful in that the shock load is distributed to the extension parts 42, 42, 52, 52 at four places by the above-described behavior of the rectangular frame part (41, 51, 6, 6), so that shock is absorbed efficiently.

Also, including the case in which the right and left rear-floor side members 2, 2 are deformed likewise by a rear end full overlap collision or the like, the extension parts 52, 52 of the rear-floor rear cross member 5, which are arranged so as to tilt in the vehicle width direction, are deformed so as to be elongated in the vehicle width direction (to decrease the tilt) by the shock load applied from the vehicle rear, so that the shock load can be distributed to the rear-floor side members 2, 2 on both sides in the vehicle width direction.

Furthermore, in the case in which the rear-floor center cross member 4 comes into contact with a fuel tank 15 (FIG. 5) arranged in front thereof along with the above-described behavior of the rectangular frame part (41, 51, 6, 6), the body part 41 of the rear-floor center cross member 4 comes into contact with the flat rear surface part of the fuel tank 15 in a state of maintaining the flat shape and posture thereof together with the rectangular frame part (41, 51, 6, 6), so that local deformation of the fuel tank 15 can be avoided.

Also, most of the shock load transmitted to the rear-floor rear cross member 5 through the spare tire housing of the rear-floor panel 12, which accommodates a spare tire, is received by a rigid structure part formed by the rear-floor rear cross member body part 51 and the reinforcement 53 therefor, and is transmitted to the rear-floor center cross member body part 41 via the rear-floor cross member braces 6, 6. In this process, as described previously, shock energy is absorbed by the deformation of the extension parts 42 and 52, but a structure such as the rear-floor cross member braces 6, 6 is absent in front of the rear-floor center cross member 4.

However, by the reinforcements 43, 43 in the connecting parts between the body part 41 and the right and left extension parts 42, 42 of the rear-floor center cross member 4, the deformation of the extension parts 42, 42 is restrained as compared with the rear-floor rear cross member 5 side, and the center of deformation is shifted to the rear-floor side member 2. Therefore, in the case in which the shock load is excessive, the shock load is distributed to the rear-floor side members 2, 2 via the reinforcements 43, 43, so that the deformation of the cabin can be held to a minimum.

The above is a description of an embodiment of the present invention. The present invention is not limited to the above-described embodiment, and various modifications and changes can be made based on the technical concept of the present invention.

For example, in the above-described embodiment, the case in which both of the rear-floor center cross member 4 and the rear-floor rear cross member 5 are formed by the three-member connected body consisting of the body part 41, 51 and the extension parts 42, 52 has been described. However, only the rear-floor rear cross member 5 on the rear side can be formed by the three-member connected body. Also, the connection of the body part 41, 51 to the extension part 42, 52 of the rear-floor center cross member 4 and the rear-floor rear cross member 5 is not subject to any special restriction. This connection may be made by a means other than welding, for example, by fastening of a screwing member such as bolt and nut.

In the case in which the connection is made by a screwing member, the rectangular frame part formed by the body parts 41 and 51 of the rear-floor center cross member 4 and the rear-floor rear cross member 5 and the right and left rear-floor cross member braces 6, 6 is detachable, so that the assembly and maintenance of parts disposed in the frame part can be accomplished easily. In this case, the configuration can be made such that the rectangular frame part is separated from the rear-floor panel to secure a space for placing articles therebetween.

Also, in the above-described embodiment, the case in which the reinforcement 53 is joined to the body part 51 of the rear-floor rear cross member 5 to improve the rigidity of the body part 51, by which deformation caused by the application of a shock load from the rear is guided to the right and left extension parts 52, 52 (42, 42) has been described. However, the configuration can be made such that by adjusting the connection strength with the body part 51 (41), deformation is guided to the right and left extension parts 52, 52 (42, 42). To guide deformation to the right and left extension parts 52, 52 (42, 42), the plate thicknesses of the right and left extension parts 52, 52 (42, 42) can be made relatively smaller than the plate thickness of the body part (41), the material strength thereof can be made relatively low, or a shape for guiding deformation, such as a bead or a notch, can be provided, and these means can be used in combination selectively and appropriately.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vehicle body rear structure comprising:
   right and left rear-floor side members extending substantially in the vehicle longitudinal direction on both sides of a vehicle body rear part;
   a first rear-floor cross member extending between and rigidly connected to the right and left rear-floor side members;
   a second rear-floor cross member, located posterior to the first rear-floor cross member, extending between and rigidly connected to the right and left rear-floor side members; and
   a pair of right and left rear-floor cross member braces each extending between and rigidly connected to the first and second rear-floor cross members,
   wherein the second rear-floor cross member is formed by a three-piece connected member comprising:
      right and left extension parts each having one end connected to the respective rear-floor side members and other end opposite to the one end; and
      a body part arranged between the right and left extension parts and having right and left ends connected to the respective other ends of the right and left extension parts, and
   wherein respective rear ends of the paired right and left rear-floor cross member braces are connected to the body part of the second rear-floor cross member and wherein the body part of the second rear-floor cross member further comprises a second reinforcement extending at least throughout a connecting region with the right and left rear-floor cross member braces and being joined to the body part of the second rear-floor cross member.

2. The vehicle body rear structure according to claim 1, wherein the first rear-floor cross member is formed by a three-piece connected member comprising:
   right and left extension parts each having one end connected to the respective rear-floor side members and other end opposite to the one end; and
   a body part arranged between the right and left extension parts and having right and left ends connected to the respective other ends of the right and left extension parts, and
   wherein respective rear ends of the paired right and left rear-floor cross member braces are connected to the body part of the first rear-floor cross member.

3. The vehicle body rear structure according to claim 2, wherein the first rear-floor cross further comprises first reinforcements both of which are joined to areas extending from the right and left extension parts of the first rear-floor cross member to the right and left side portions of the body part of the first rear-floor cross member including a connecting region with respective front ends of the right and left rear-floor cross member braces of the second rear-floor cross member.

4. The vehicle body rear structure according to claim 3, wherein both the connection between the body parts and the extension parts of the first and second rear-floor cross members and the connection between the body part of the first rear-floor cross member and the first reinforcements are made by the fastening of a screwing member penetrating the overlapping part.

* * * * *